United States Patent [19]

Koppens

[11] Patent Number: 4,634,362

[45] Date of Patent: Jan. 6, 1987

[54] DEVICE FOR MAKING ANNULAR PRODUCTS FROM MOLDABLE FOODSTUFF

[75] Inventor: Wilhelmus F. A. Koppens, Bakel, Netherlands

[73] Assignee: Koppens Machinefabriek B.V., Bakel, Netherlands

[21] Appl. No.: 701,934

[22] Filed: Feb. 15, 1985

[30] Foreign Application Priority Data

Feb. 15, 1984 [NL] Netherlands ............... 8400478

[51] Int. Cl.⁴ .................. A22C 7/00; B29C 43/04; B29C 47/10
[52] U.S. Cl. .................................. 425/287; 17/32; 425/324.1; 425/383; 425/436 R; 425/448
[58] Field of Search .............. 17/1 R, 32; 425/253, 425/256, 260, 359, 412, 422, 444, 287, 318, 324.1, 383, 436 R, 448

[56] References Cited

U.S. PATENT DOCUMENTS

| 2,651,430 | 9/1953 | Garfunkel | 17/32 |
|---|---|---|---|
| 3,177,524 | 4/1965 | Gause | 17/32 |
| 3,725,974 | 4/1973 | Kuhlman | 17/32 |
| 3,940,217 | 2/1976 | McCarthy et al. | 17/32 |
| 3,982,035 | 9/1976 | Orlowski | 425/261 |
| 4,118,831 | 10/1978 | Holly et al. | 17/32 |
| 4,207,654 | 6/1980 | Koppens | 17/32 |
| 4,254,534 | 3/1981 | Koppens | 17/32 |
| 4,260,640 | 4/1981 | Hartmann et al. | 426/516 |
| 4,356,595 | 11/1982 | Sandberg et al. | 17/32 |

FOREIGN PATENT DOCUMENTS 2073089 10/1981 United Kingdom .

Primary Examiner—Willard E. Hoag
Attorney, Agent, or Firm—Seed and Berry

[57] ABSTRACT

A device for manufacturing annular shaped products is achieved by forming a recess which extends about a plate-shaped part of a slide which is connected with the surrounding part of the slide with the aid of a few connecting ribs. The thickness of the plate-shaped part is at least substantially equal to the thickness of the slide part surrounding the recess and the height of the connecting ribs is less than said thickness. The undersides of the ribs are at a level above that of the underside of the slide part surrounding the recess. An expelling member is provided with hanging limbs separated from one another by slots in a manner such that the hanging limbs fit in the holes between the connecting ribs. The connecting ribs can fit in the slots.

2 Claims, 8 Drawing Figures

DEVICE FOR MAKING ANNULAR PRODUCTS FROM MOLDABLE FOODSTUFF

DESCRIPTION

1. Technical Field

The invention relates to a device for manufacturing products from moldable foodstuff, for example, meat. Such device includes a hopper for holding the foodstuff; and a slide having at least one recess for use in the formation of the products, said slide being reciprocally movable between a first position in which the material can move from the hopper into the recess and a second position in which the recess is located at the side of the hopper and opposite an expelling member. The expelling member is reciprocally movable in a direction transverse to the slide for expelling the product from the recess.

2. Background Art

Devices for manufacturing products from moldable foodstuff, which are known, for example, from U.S. Pat. Nos. 4,207,654 and 4,254,534, are used for manufacturing disk-shaped products, the shape of the formed products corresponding with the shape of recesses or holes in a slide and usually have a round cross-section. In practice there is often a need for more or less annular products of food-stuff, for example, meat, fish or vegetables. An object of the invention is to provide a device of the kind set forth which enables the manufacture of such annular products.

Moreover, existing devices, such as those disclosed in the aforesaid U.S. Patents, can be adapted in a simple manner by arranging suitable fillers in the slide to form the annular products.

It should be noted that British Patent Application No. 2,073,089 discloses a matrix plate having an annular passage, while the core of the matrix plate is connected with the further part of the matrix plate with the aid of connecting ribs. This matrix plate is intended for continuously extruding tubular products and hence said British Patent Application No. 2,073,089 does not provide any indication relating to a direct manufacture of annular products.

DISCLOSURE OF THE INVENTION

A device for manufacturing annular shaped products is achieved by forming a recess which extends about a plate-shaped part of a slide which is connected with the surrounding part of the slide with the aid of a few connecting ribs. The thickness of the plate-shaped part is at least substantially equal to the thickness of the slide part surrounding the recess and the height of the connecting ribs is less than said thickness. The undersides of the ribs are at a level above that of the underside of the slide part surrounding the recess. An expelling member is provided with hanging limbs separated from one another by slots in a manner such that the hanging limbs fit in the holes between the connecting ribs. The connecting ribs can fit in the slots.

When the construction embodying the invention is used, foodstuff will flow, when the recess is being filled, from the hopper between the ribs and into the recess. Below the ribs the material joins again because the overall depth of the recess exceeds the thickness of said ribs.

The recess is subsequently positioned below an expelling member. The material can be pressed out of the recess without losing the cohesion of the material by means of the expeller especially formed for this purpose. When the device embodying the invention is used, annular products of foodstuff for example, meat can thus be readily and effectively formed.

It should be noted that the term of annular products has to be understood to mean not only more or less circular products, but also any other continuous form of the products.

The invention will be described more fully hereinafter with reference to the accompanying drawings schematically showing an embodiment of the construction in accordance with the invention.

BEST MODE

Figure 1:
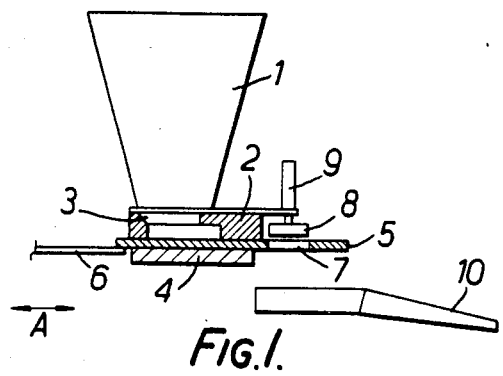
FIG. 1 is partly a schematic elevational view and partly a sectional view of an embodiment of a device in accordance with the invention.

The device shown in FIG. 1 comprises a hopper 1 supported by a frame (not shown) for holding the foodstuff to be processed. The hopper is disposed over a plate 2 having a portion thereof forming a hopper outlet passage 3. Between the plate 2 and a supporting plate 4 is a slide 5 which is adapted to reciprocate as indicated by the arrow A with the aid of a driving mechanism (not shown in detail), coupled to the slide 5 by means of a coupling rod 6. The slide contains a plurality of holes 7, which are usually provided in series across the slide 5 as shown in FIG. 2.

The slide is adapted to reciprocate in the direction of the arrow A between a first position in which the holes 7 communicate with the outlet port 3 of the hopper so that they can be filled with foodstuff from the hopper and the position shown in FIG. 1, in which each hole is located below an expelling member 8. The expelling members are disposed above said holes and movable up and down in a vertical direction such as with the aid of a cylinder 9. Upon a downward movement of the expeller 8 the foodstuff located in the recess 7 is pressed out of the recess. The formed product then arrives at a delivery member 10, or chute, disposed below the slide.

In the hitherto conventional devices, for example, in U.S. Pat. Nos. 4,207,654 and 4,254,534, the slide usually has a plurality of circular holes into which correspondingly shaped expelling members 8 can be pressed for removing the formed products.

Figure 2:
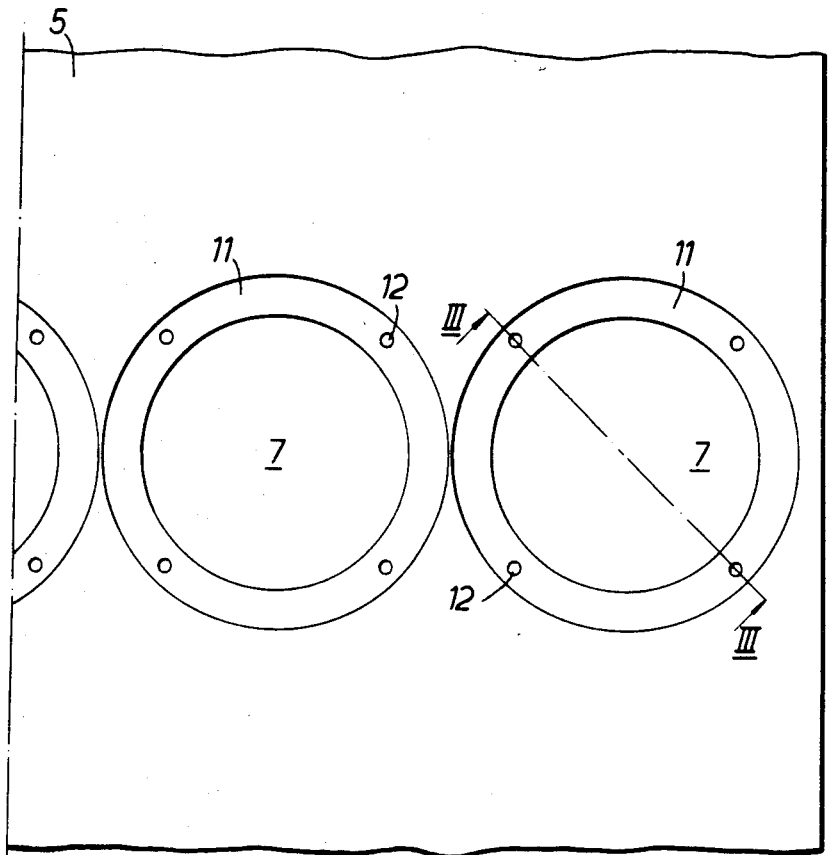
FIG. 2 is an enlarged plan view of part of a slide.
Figure 3:
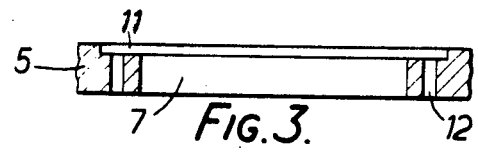
FIG. 3 is a sectional view of part of the slide shown in FIG. 1 taken on the line III—III in FIG. 2.

As is shown in FIGS. 2 and 3 the upper part 11 of the hole 7 has a larger diameter, while in the slide 5 and around the hole 7 tapped holes 12 are provided.

Figure 4:
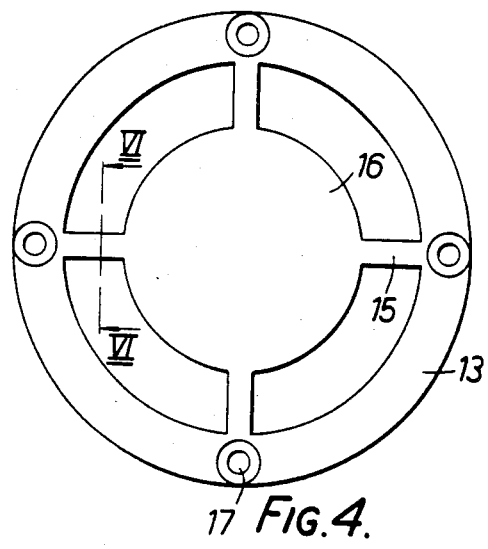
FIG. 4 is a plan view of a filler that can be disposed in a hole in the slide.
Figure 5:
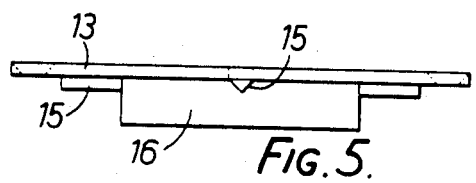
FIG. 5 is a side elevation of the filler of FIG. 4.

A filler, like that shown in FIGS. 4 and 5, is inserted into said hole. This filler consists of a thin, plate-shaped ring 13, which is connected in the embodiment shown with the aid of four connecting ribs 15 to a round, plate-shaped part 16, which is concentrically surrounded by ring 13.

When the filler is disposed in the hole 7, the inner boundary edge of the ring 13 is in line with the lower circumferential wall of the hole 7, whereas the top of the ring 13 will be coplanar with the top of the slide 5. The annular part 13, furthermore, has few countersunk bores 17 for receiving fasteners to be screwed into the holes 12, by means of which fasteners the filler can be secured to the slide 5.

The thickness of the plate-shaped part 16 corresponds with the thickness of the slide 5 so that an annular recess is formed between the outer boundary wall of the plate-shaped part 16 and the boundary wall of the hole 7.

Figure 6:
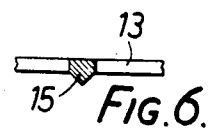
FIG. 6 is a sectional view taken on the line VI—VI in FIG. 4.

In particular from FIGS. 5 and 6 it will be apparent that the thickness of a connecting ridge 15 is only about one third of the overall thickness of the plate-shaped part 16 or of the slide 5 respectively. The lower part of the connecting ribs terminate in a ridge. In this embodiment during operation the material passing from the hopper into the annular recess in the slide 5 joins again in the recess below the ribs so that, despite the fact that the connecting ribs 15 extend into the recess, a coherent, annular product is yet obtained.

Figure 7:
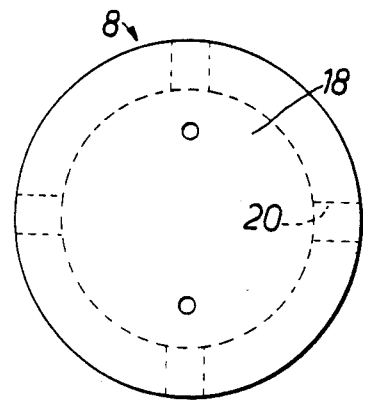
FIG. 7 is a plan view of an expelling member.
Figure 8:
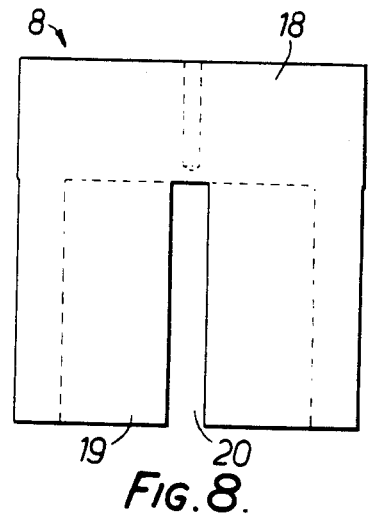
FIG. 8 is a side elevation of the expeller of FIG. 7.

As is shown in FIGS. 7 and 8 the expelling member 8 may be a sleeve-shaped member having a solid rim 18 on the top and four curved limbs 19 hanging down from said rim and separated from one another by longitudinal slots 20. The structure is such that the curved limbs 19 fit in the holes of the filler with the limbs positionable between the ribs 15. The ribs 15 are received in the slots 20 when the expelling member shown in FIGS. 7 and 8 is inserted by its hanging limbs 19 into the holes in the filler between the ribs 15 in order to expel the product.

I claim:
1. In a device for forming annular shaped products from moldable foodstuff, including a hopper for the foodstuff and a slide having part thereof defining at least one recess to form the products, said slide being adapted to reciprocate between a first position in which the material can move from the hopper into the recess and a second position in which the recess is located at the side of the hopper opposite an expelling member which is adapted to reciprocate transversely of the slide for expelling the product out of the recess the improvement wherein the recess extends around a plate-shaped part of the slide which is connected with the surrounding part of the slide with the aid of a plurality of connecting ribs, while the thickness of the plate-shaped part is at least substantially equal to the thickness of the slide part surrounding the recess and the thickness of the connecting ribs is less than said thickness of the slide and the undersides of the ribs are located at a level higher than the underside of part of the slide surrounding the recess and wherein the expelling member includes hanging limbs separated from one another by slots in a manner such that the hanging limbs fit in the holes located between the connecting ribs, while the connecting ribs can be received in the slots.

2. Apparatus, as claimed in claim 1, wherein the plate-shaped part and the connecting ribs form part of a filler positionable in a receiving hole in the slide, the ends of the ribs remote from the plate-shaped part being connected with an annular part of the filler which is fastenable to the surrounding portion of the slide.

* * * * *